Nov. 6, 1945.    J. R. ALBERS    2,388,377
ELECTRIC WIND PLANT
Filed June 29, 1942    3 Sheets-Sheet 2
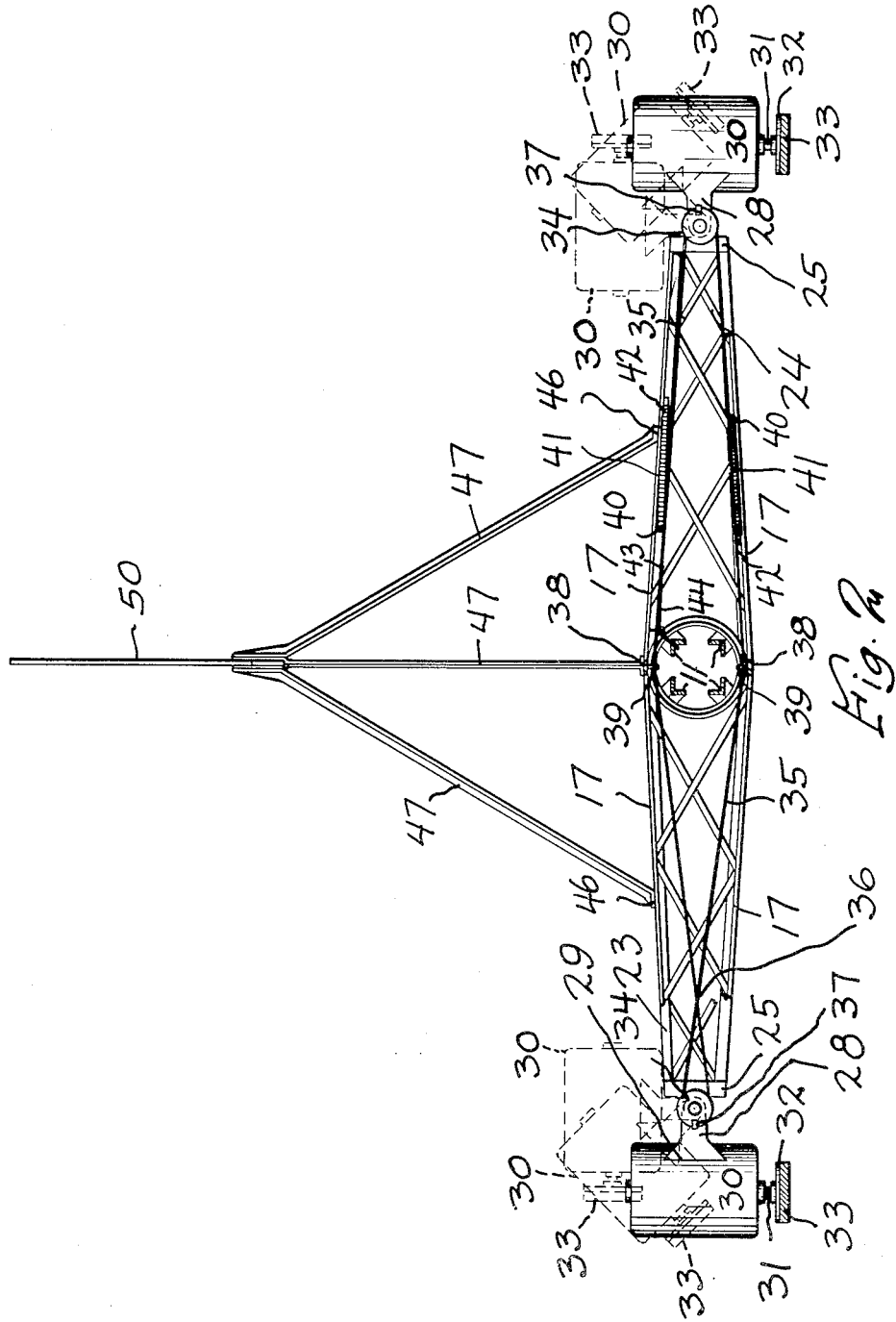
INVENTOR.
John R. Albers
BY
Sam J. Slotsky
ATTORNEY

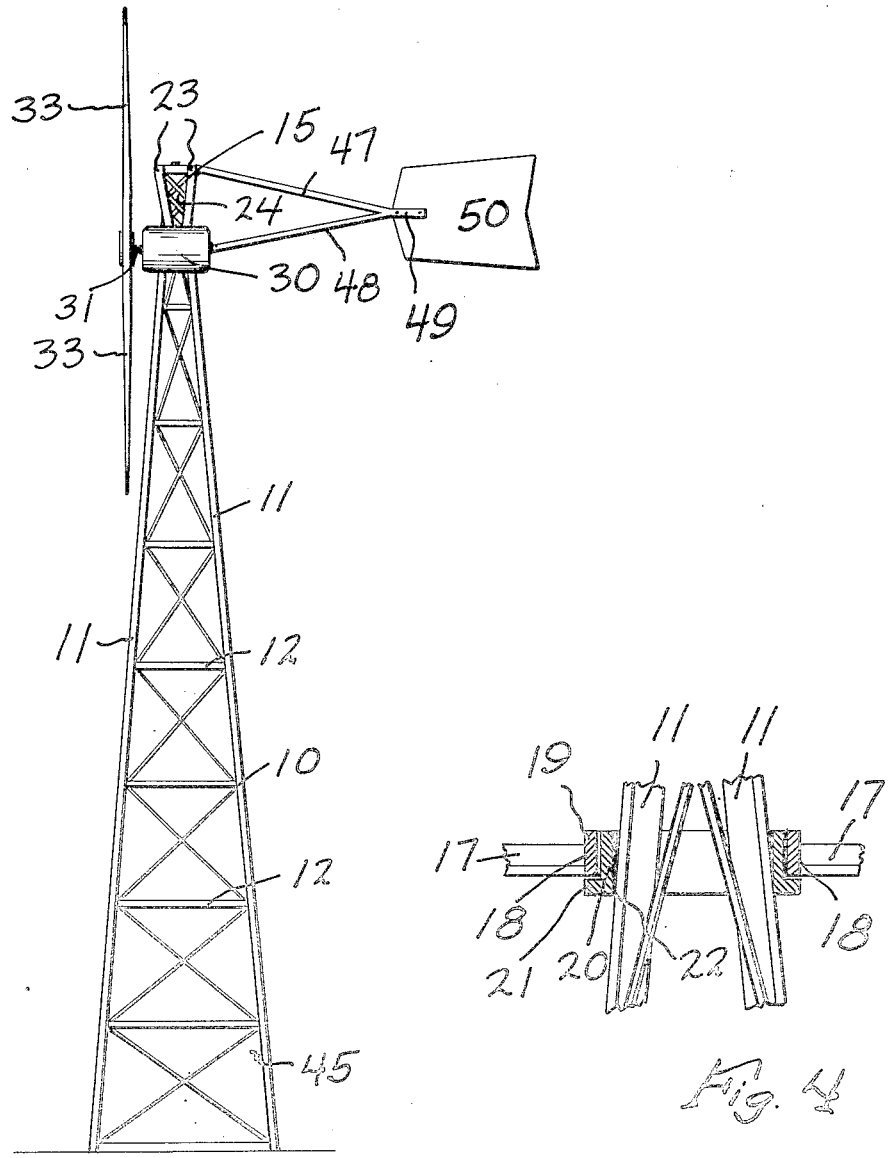

Patented Nov. 6, 1945

2,388,377

UNITED STATES PATENT OFFICE 2,388,377

ELECTRIC WIND PLANT

John R. Albers, Sioux City, Iowa, assignor to Wincharger Corporation, Sioux City, Iowa, a corporation of Minnesota Application June 29, 1942, Serial No. 448,997

8 Claims. (Cl. 290—55)

My invention pertains to an electric wind plant.

An object of my invention is to provide an improved electric wind plant having a pair of balanced wind electric units with such units being adapted to pivot simultaneously in synchronized relation to provide speed governing of the units.

A further object of my invention is to provide a wind electric plant which will develop the maximum amount of power with the greatest possible economy.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figure 2 is a plan taken in section along the lines 2—2 of Figure 1,

Figure 3 is a side elevation of the arrangement shown by Figure 1, and

Figure 4 is a detail view of a portion of the arrangement illustrated by Figure 1.

Figure 1:
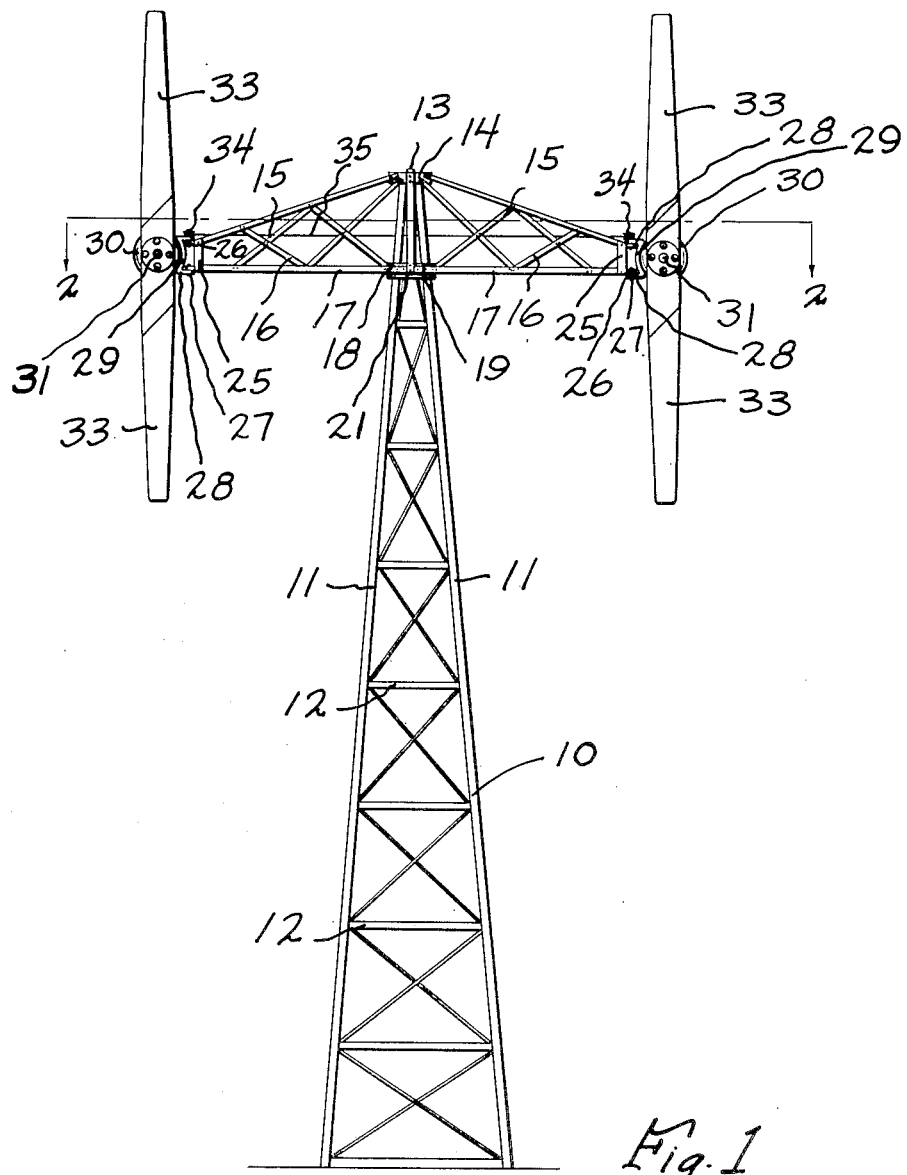
Figure 1 is a forward elevation of an arrangement incorporating my invention.

In Figures 1 and 3, a supporting tower 10, including substantially vertical legs or columns 11 and cross-braces 12 therebetween supports at its upper extremity a bearing member 13 around which there is arranged a cooperating bearing member or rotatable support 14 forming a part of a transverse truss or supporting member 15. The supporting member 15 may conveniently be constructed of bars or rods, such as metal channel members, including lower substantially horizontal members 17 and cross-braces 16. Where the horizontal members 17 pass around the legs 11 of tower 10, they are connected at points 18 to a ring 19, which, with an annular member 20 provided with a flange 21, forms a second bearing between the supporting member 15 and the tower 10. The annular member 20 is rigidly attached at points such as point 22 to the legs 11 of the tower 10.

The supporting member 15, which may conveniently be made in the form of a truss member, also includes upper supporting members 23 and substantially horizontal cross-braces 24 arranged so that the entire supporting member 15 is substantially rigidly supported from the bearing member 14 and the ring 19 and so that it forms a substantially rigid supporting structure.

Plates 25 are rigidly connected at the respective outer ends of the supporting member 15 and are respectively provided with outwardly extending ears 26. A pivot bearing 27 is provided between the extending ears 26 and the ears 28 which may conveniently form integral extensions of brackets 29 which are respectively fastened to a pair of electric generators 30. The generators 30 include rotating driving shafts 31 to which are respectively fastened hub plates 32 supporting a pair of wind driven impeller blades 33.

Attached to the upper ears 28, and about the pivoting point 27 are a pair of pulleys 34 about which pass the cable 35 which cable is reversed as at 36, and such cables are firmly locked to the pulleys by means of the retaining members 37. A pair of braces 38 are attached between the upper member 14 and the ring 19, and also attached to the braces 38 are the small pulleys 39 which serve to space the cable properly so it does not contact the tower legs. Attached to the cable 35 at 40 are the helical springs 41 which are attached to the truss 42. Attached at 43 to the cable 35 is a further cable 44 which passes downwardly along one of the legs 11 down to the windlass 45 (see Figure 3). Attached at 46 to the truss framework are the brackets 47 and 48 which are attached at 49 to the tail vane 50.

In this described structure the entire unit comprising the truss 15, the impeller units 33 and 30, and the tail vane structure, is free to rotate about the entire tower 10 upon the pivotal axis 13. As a result, the impeller blades 33 rotate in a plane at normal speeds which is at right angles to the wind direction. The axes of the units then lie in substantially normally mutually parallel directions corresponding to the direction of the oncoming wind.

However at increasing wind velocities the wind pressure against the rotating blades, forces the units gradually to the dotted positions shown in Figure 2 and about the pivotal points 27. This action causes the effective area of the blades to be lessened thereby preventing increase in speed above that predetermined by the governor springs adjustment.

The governing effect is also balanced through the synchronizing arrangement of the cables 35 and the pulleys 34, it being noted that the crossed over cables cause the units to pivot in a synchronous manner and with the shafts 31 moving in a direction to provide a decreasing angle between the shaft and the truss as the wind velocity increases, such angles on both units always being the same through the above described synchronizing arrangement. The small pulleys 39 permit the truss to rotate about the tower without interference and the locking members 37 prevent slippage of the cable 35. The springs 41 are arranged to exert tension against the cables 35 to normally retain the impeller units with the shafts 31 transverse to the truss member, or parallel to the tail vane 50.

The impeller units thereby pivot to any angular position, in the present instance being from the forward position to approximately 90 degrees therefrom, and if it is desired to manually prevent the impeller blades from rotating, the cable 44 is drawn downwardly by means of the windlass 45 (see Figure 3), which swings the units to the dotted position wherein the blades 33 only present their edges to the wind thereby presenting no effective surfaces.

The rings 19 and 20 provide an arrangement wherein the center of gravity of the truss is lowered sufficiently to provide a smooth pivotal action without undue binding, with the rotational engagement of the ring 19 with the inner ring 20 providing the necessary bearing.

It is also apparent that the units are balanced at any wind velocity both angularly as well as rotationally, with the necessary governing effect being provided.

In accordance with the terminology prevalent in the art each one of the pair of generator impeller blade arrangements 30, 32 is of the so-called side governing type as exemplified in my prior Patent 2,204,462. When mounted in pairs as disclosed herein the units are balanced at any wind velocity both angularly as well as rotationally, with the necessary governing effect being provided.

When each unit is mounted separately and independently of one another as shown in my above mentioned patent certain inherent undesirable operating characteristics result during speed governing operation. That is, there is a certain amount of yawing action produced due to wind forces acting simultaneously on the tail vane and impeller movable with respect thereto and to forces biasing the impeller axis in the direction of an oncoming wind.

Such yawing action is quite common in the many side governing arrangements now in use and is due to the fact that when and as the impeller axis is deflected out of the direction of an oncoming wind, the tail vane coupled thereto through the resilient restoring means tends to be deflected, however slight, also out of the direction of the oncoming wind. When and as the tail vane tends to move out of the direction of the oncoming wind a restoring wind force acting on the tail vane is introduced. Such resulting wind force on the tail vane causes the impeller axis to return to a position in the direction of the oncoming wind from where it is again deflected out of such direction with the net result that the impeller axis and tail vane resiliently coupled thereto vibrates in a wind approaching from the same constant direction.

It is seen from the drawings that a balanced yaw free system is provided wherein there is no yawing or vibration in the individual or composite units. Such a yaw free or vibration free system results from the fact that individual units including impellers of the same size are mounted in pairs equidistant from the tail vane and from the fact that the impeller axes, during governing action, move synchronously in opposite directions from one another whereby equal and oppositely acting forces on the tail vane caused by individual movements of the impeller axes are exerted on the tail vane with the net result that there is no unbalanced force on the tail vane causing objectionable secondary effects such as yawing or vibration.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim as my invention:

1. A wind plant comprising a tower, a truss member pivotally supported at the top of said tower and extending transversely thereof, wind driven impeller units attached to the ends of the truss member, a tail vane attached to the truss member and positioned at right angles thereto, said wind driven units being pivotally attached to the truss ends whereby wind forces acting against said impeller units cause pivotal movement thereof with respect to the truss member, and means attached to and between the wind driven impeller units to provide synchronized pivotal movement thereof, said synchronizing means being arranged to cause substantially equal pivotal movements of the impeller units so that the rotational axes of the units form substantially equal decreasing angles with respect to the truss member corresponding to increased wind velocities, said synchronizing means including pulleys attached to the impeller units on the pivoting points thereof, and a crossed cable attached to said pulleys and passing over said pulleys.

2. A wind plant comprising a tower, a truss member pivotally supported at the top of said tower and extending transversely thereof, wind driven impeller units attached to the ends of the truss member, a tail vane attached to the truss member and positioned at right angles thereto, said wind driven units being pivotally attached to the truss ends whereby wind forces acting against said impeller units cause pivotal movement thereof with respect to the truss member, means attached to and between the wind driven impeller units to provide synchronized pivotal movement thereof, said synchronizing means being arranged to cause substantially equal pivotal movements of the impeller units so that the rotational axes of the units form substantially equal decreasing angles with respect to the truss member corresponding to increased wind velocities, said synchronizing means including pulleys attached to the impeller units on the pivoting points thereof, a crossed cable attached to said pulleys and passing over said pulleys, and means for pivotally supporting said truss member at the top of said tower comprising a bearing ring attached to the tower and spaced from the top thereof, and a further ring receiving said bearing ring and attached to the truss member to provide rotatable movement of the truss member according to varied wind directions.

3. An electric wind plant comprising, a tower, a truss member pivotally supported at the top of said tower and extending transversely thereof, wind driven impellers attached to the ends of the truss member, a generator connected with each of said wind driven impellers to form a unit, each unit being arranged to be supported by the respective end of said truss member, a tail vane attached to the truss member and positioned at right angles thereto, said wind driven units being pivotally attached to the truss ends whereby wind forces acting against said impeller units cause pivotal movement thereof with respect to the truss member, and means attached to and between the wind driven impeller units to provide synchronized pivotal movement thereof, said synchronizing means being arranged to cause substantially equal pivotal movements of the impeller units so that the rotational axes of the units form substantially equal decreasing angles with respect to the truss member corresponding to increased wind velocities, said synchronizing means including pulleys attached to the units on the pivoting points thereof, and a crossed cable attached to said pulleys and passing over said pulleys.

4. An electric wind plant comprising, a tower, a truss member pivotally supported at the top of said tower and extending transversely thereof, wind driven impellers attached to the ends of the truss member, a generator connected with each of said wind driven impellers and arranged to be supported by the respective end of said truss member, said generator and impeller comprising a unit, a tail vane attached to the truss member and positioned at right angles thereto, said wind driven units being pivotally attached to the truss ends whereby wind forces acting against said impeller units cause pivotal movement thereof with respect to the truss member, means attached to and between each of the wind driven impeller units to provide synchronized pivotal movement thereof, said synchronizing means being arranged to cause substantially equal pivotal movements of the impeller units so that the rotational axes of the units form substantially equal decreasing angles with respect to the truss member corresponding to increased wind velocities, said synchronizing means including pulleys attached to the impeller units on the pivoting points thereof, a crossed cable attached to said pulleys and passing over said pulleys, and means for pivotally supporting said truss member at the top of said tower comprising a bearing ring attached to the tower and spaced from the top thereof, and a further ring receiving said bearing ring and attached to the truss member to provide rotatable movement of the truss member according to varied wind directions.

5. In combination, a pair of wind driven impeller units of the side governed type, a supporting member, a tail vane mounted on said supporting member and arranged to orient itself with respect to an oncoming wind, each of said impeller units being pivotally mounted at spaced points on said supporting member, means responsive to pivotal movement of one of said impeller units for simultaneously pivoting oppositely in equal amount the other one of said impeller units, and a spring having one of its ends attached to one of said impeller units for simultaneous movement with pivotal movement of said impeller units and its other end fixedly mounted on said supporting means, said spring biasing the impeller axis of rotation of each unit in substantially normally mutually parallel directions corresponding to the direction of an oncoming wind in winds below a predetermined velocity.

6. In combination, a pair of impeller units of the side governed type, a supporting member, a tail vane mounted on said supporting member, each of said impeller units being pivotally mounted as a separate unit on said supporting member at spaced points substantially equidistant from said tail vane, resilient means normally biasing the impeller axis of rotation of each one of said impeller units in substantially normally mutually parallel directions corresponding to the direction of an oncoming wind in winds below a predetermined velocity, said resilient means exerting a force between said supporting means and one of said impeller units, and means responsive to pivotal movement of one of said impeller units against the biasing action of said resilient means for simultaneously pivoting oppositely in equal amount the other one of said impeller units against the biasing action of said resilient means, whereby unbalanced forces on said tail vane resulting from pivotal movement of one of said pair of impeller units is substantially counterbalanced by the unbalanced force on said tail vane resulting from simultaneous movement of the other one of said pair of impeller units.

7. The invention set forth in claim 5 characterized by an electrical generator connected with each of said impeller units.

8. The invention set forth in claim 6 characterized by an electrical generator connected with each of said impeller units.

JOHN R. ALBERS.